(12) United States Patent
Keys

(10) Patent No.: US 10,390,103 B2
(45) Date of Patent: Aug. 20, 2019

(54) REMOTE CONTROL DEVICES, SYSTEMS, AND METHODS TO OUTPUT CONTENT WHILE FASTFORWARDING THROUGH CONTENT ON A SEPARATE DISPLAY DEVICE

(71) Applicant: Jeramie Jay Keys, Roswell, GA (US)

(72) Inventor: Jeramie Jay Keys, Roswell, GA (US)

(*) Notice: Subject to any disclaimer, the term of this patent is extended or adjusted under 35 U.S.C. 154(b) by 8 days.

(21) Appl. No.: 15/266,064

(22) Filed: Sep. 15, 2016

(65) Prior Publication Data

US 2017/0006354 A1    Jan. 5, 2017

Related U.S. Application Data

(63) Continuation of application No. 14/144,538, filed on Dec. 30, 2013, now Pat. No. 9,451,199.

(Continued)

(51) Int. Cl.
*H04N 5/783* (2006.01)
*H04N 21/81* (2011.01)
*H04N 5/765* (2006.01)
*G11B 27/00* (2006.01)
*H04N 9/87* (2006.01)
(Continued)

(52) U.S. Cl.
CPC ......... *H04N 21/812* (2013.01); *G11B 27/005* (2013.01); *H04N 5/44582* (2013.01); *H04N 5/765* (2013.01); *H04N 9/87* (2013.01); *H04N 21/4126* (2013.01); *H04N 21/4222* (2013.01); *H04N 21/4223* (2013.01); *H04N 21/42204* (2013.01); *H04N 21/42209* (2013.01); *H04N 21/42221* (2013.01); *H04N 21/42222* (2013.01); *H04N 21/42224* (2013.01); *H04N 21/4312* (2013.01); *H04N 21/47217* (2013.01); *H04N 21/6587* (2013.01); *H04N 21/8166* (2013.01); *H04N 2005/4435* (2013.01); *H04N 2005/44547* (2013.01)

(58) Field of Classification Search
CPC ............................ H04N 21/812; G11B 27/005
See application file for complete search history.

(56) References Cited

U.S. PATENT DOCUMENTS

2004/0034874 A1* 2/2004 Hord ................. H04N 5/76
725/136
2012/0108230 A1* 5/2012 Stepanian ............ G06F 21/10
455/422.1

(Continued)

*Primary Examiner* — Girumsew Wendmagegn
(74) *Attorney, Agent, or Firm* — Withers & Keys, LLC

(57) ABSTRACT

A remote control device used by a viewer to control content being displayed on a separate display device outputs content in response to instructing the device providing content to the separate display device to begin fast forwarding. The viewer of the separate display device may then be exposed to the content being output by the remote control device while the content to the separate display device is fast forwarding. Thus, the viewer may better perceive the content being output by the remote control device than the content being fast forwarded on the separate display device. The outputting of content may be by the remote control device providing video, a static display, and/or audio. Upon the remote control device instructing the fast forwarding at the display device to stop and return to a play mode, the remote control device terminates the outputting of the content from the remote control device.

20 Claims, 6 Drawing Sheets

Related U.S. Application Data

(60) Provisional application No. 61/747,906, filed on Dec. 31, 2012.

(51) Int. Cl.
*H04N 5/445* (2011.01)
*H04N 21/422* (2011.01)
*H04N 21/472* (2011.01)
*H04N 21/41* (2011.01)
*H04N 21/4223* (2011.01)
*H04N 21/431* (2011.01)
*H04N 21/6587* (2011.01)
*H04N 5/44* (2011.01)

(56) References Cited

U.S. PATENT DOCUMENTS

| | | | |
|---|---|---|---|
| 2012/0131098 A1* | 5/2012 | Wood | G06F 3/0482 709/203 |
| 2012/0188112 A1* | 7/2012 | Beals | H04N 21/42225 341/176 |

\* cited by examiner

REMOTE CONTROL DEVICES, SYSTEMS, AND METHODS TO OUTPUT CONTENT WHILE FASTFORWARDING THROUGH CONTENT ON A SEPARATE DISPLAY DEVICE

TECHNICAL FIELD

Embodiments are related to remote control devices, systems, and methods that are used to control the fast forwarding of content on a separate display device. More particularly, embodiments are related to remote control devices, systems, and methods that output content while fast forwarding through content on the separate display device.

BACKGROUND

The ability for an advertiser to convey an advertising message to television viewers is hindered when the television viewer is using a digital video recorder (DVR) or a video on demand and opts to fast forward through the commercial break where the commercial of the advertiser is located. While fast forwarding, the viewer typically sees only bits and pieces of any given commercial during the commercial break, and the audio is typically muted altogether. Therefore, the value of the commercial break to the advertiser may be greatly diminished.

There have been efforts to address this issue. For instance, alternative commercial content may be displayed by the DVR on the same display device where the commercial break is being fast forwarded either as an overlay or as a total replacement. As a more drastic alternative, there have been proposals to block the fast forward function at least during the playback of certain content or commercials. In either case, the television viewer may not be satisfied, either with the alteration of the content being shown on the display device during fast forwarding or with the prevention of fast forwarding altogether.

SUMMARY

Embodiments address issues such as these and others by providing an output of content such as commercials from a remote control device while the content being displayed on a separate display device is being fast forwarded by operation of the remote control device. Thus, the content being displayed on the separate display device is not necessarily altered during fast forwarding of that content yet the television viewer operating the remote control device is exposed to the content being output from the remote control device during the fast forwarding of the content on the separate display device.

Embodiments provide a method of providing advertisements to a viewer of a display device. The method involves receiving a fast forward selection from the viewer on a remote control device to initiate a fast forwarding of content being displayed on a display device. The method further involves upon receiving the fast forward selection at the remote control device, beginning presentation of advertising content via a content output of the remote control device.

Embodiments provide a remote control device for providing advertisements to a viewer of a display device. The remote control device includes an input that receives a fast forward selection from the viewer to initiate a fast forwarding of content being displayed on a display device, a remote control instruction output that produces a fast forward instruction upon the input receiving the fast forward selection, and a content output that, upon the input receiving the fast forward selection, begins presentation of advertising content.

DETAILED DESCRIPTION

Embodiments provide remote control devices, systems, and methods that allow for a remote control device to initiate fast forwarding of content on a separate display device and output content from the remote control device while the fast forwarding of content on the separate display device is occurring. According to various embodiments, termination of the fast forwarding of content on the separate display device can then terminate the outputting of content on the remote control device.

Figure 1:
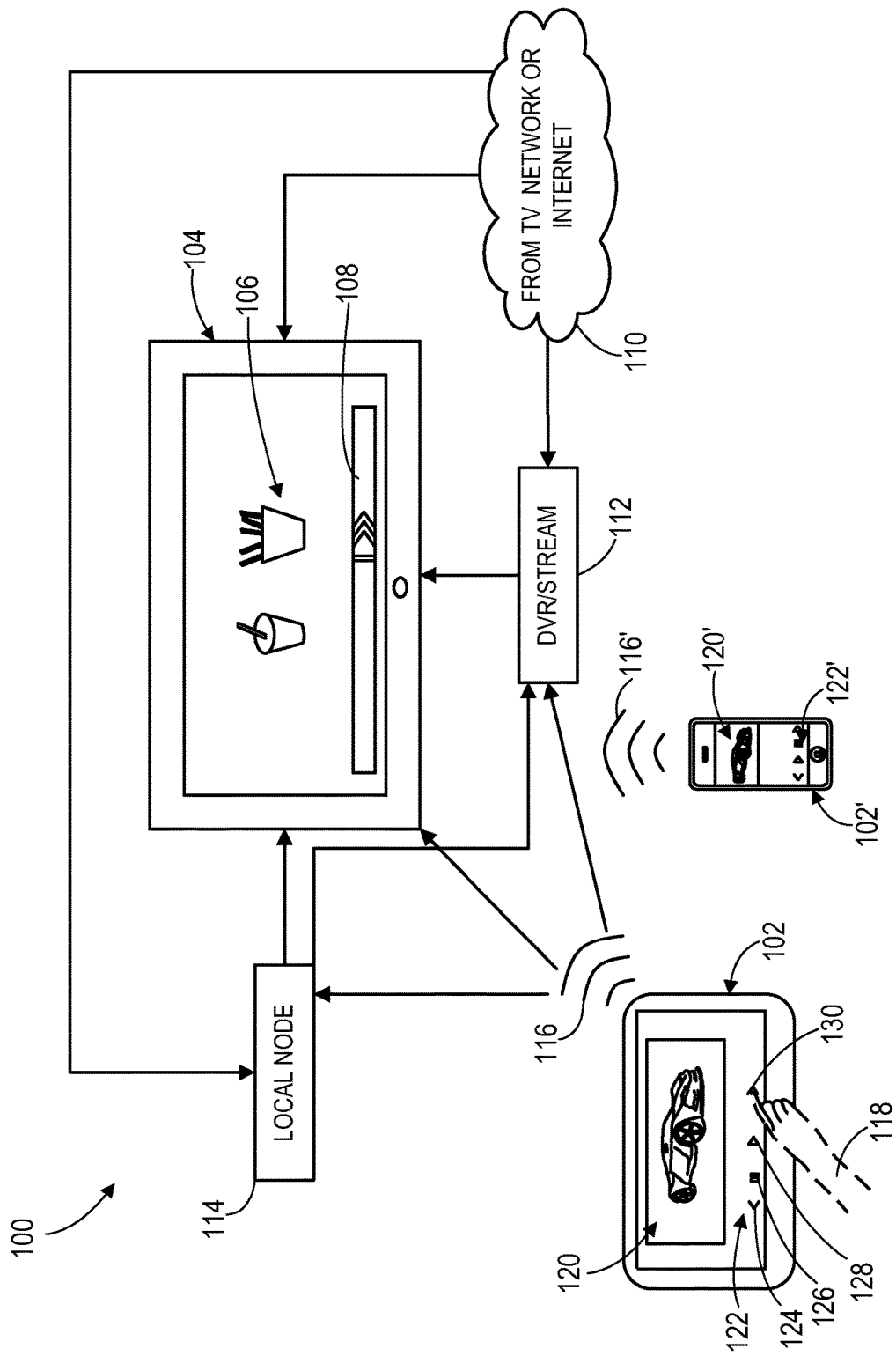
FIG. 1 shows an operating environment for embodiments that provide output of content on a remote control device while fast forwarding through content on a separate display device.

FIG. 1 shows a typical operating environment 100 for various embodiments. A remote control device such as a computing device is present to control the display of content on a separate display device 104. In this particular example, the remote control device may be a computing device 102 or 102', where the computing device 102 has a housing providing a tablet computer form factor while the computing device 102' has a housing providing a smartphone form factor, such form factors being well known in the art.

The remote control device 102 has a display that shows remote control functions 122, including a rewind function 124, a pause function 126, a play function 128, and a fast forward function 130. A television viewer 118 can touch the appropriate function on the display of the device 102 to cause a command to be sent to an external device that provides the content to the display device 104 and/or to the display device 104 itself where the display device 104 controls the content. Similarly, the remote control device 102' has the same set of remote control functions 122'.

The command to control the content being shown in the separate display device 104 may be sent via a wireless signal 116, 116' such as an infrared signal, a radio frequency signal such as a Bluetooth® signal or some other proprietary signal, or via an IEEE 802.11 protocol or other wireless networking signal. The signal 116, 116' may be directed to one of various components depending upon the configuration of equipment being used to provide content to the separate display device 104. For instance, a DVR 112 connected to a dedicated television distribution network 110 or a content streaming device connected to the Internet may be providing the content and in that case the signal 116, 116' is directed to that DVR 112 or streaming device. The DVR 112 or streaming device may additionally or alternatively be connected to the distribution network or Internet through a local node 114 such as a home router or gateway 114 and in such a case the signals 116, 116' may alternatively be wireless networking signals that are directed through the node 114 to the device 112.

As another example, the display device 104 may have a direct connection to the television distribution network 110 or Internet and the signal 116, 116' may be directed to the display device 104. The display device 104 may have a network connection to the node 114 and the signals 116, 116' may be wireless networking signals directed through the node 114 to the display device 104 in that case.

Upon the television viewer 118 deciding to fast forward through a commercial, or according to some embodiments fast forward through any content, by selecting the fast forward control function 130, the content 106 being provided to the display device 104 begins to fast forward. The timeline 108 of the content may be displayed for the viewer 118 and may show an indicator of the fast forwarding mode that is currently in use.

The remote control device 102, 102' may respond to the television viewer 118 selecting the fast forward command 130 by beginning to output content that the television viewer 118 can perceive. For example, the remote control device 102, 102' may provide a video display 120 of content such as advertising content. Rather than video content, the remote control device 102, 102' may display static content such as a logo of a particular brand of product and/or an image of the product being advertised. As yet another example, the remote control device 102, 102' may output audio such as advertising content either in conjunction with video or a still image or as an alternative to a visual display. In any of these cases, the content being output by the remote control device 102, 102' may be related to commercial content being fast forwarded on the separate display 104 or may be unrelated to the commercial content on the separate display 104.

The television viewer 118 is thereby provided with the ability to fast forward through commercial breaks in the programming being watched on the separate display 104 while still being exposed to content such as advertising content on the remote control device 102, 102'. This content from the remote control device 102, 102' may be significantly more perceptible to the television viewer 118 than the content being fast forwarded on the separate display device 104. Thus, advertisers may be willing to purchase advertising time on the remote control device 102, 102'.

While the discussion thus far has been in the context of the television viewer 118 choosing to fast forward through content on the separate display device 104, it will be appreciated that other functions selected by the viewer 118 may also trigger the remote control device 102, 102' to begin outputting content. One other example is when the viewer 118 chooses to select the rewind function 124.

Figure 2:
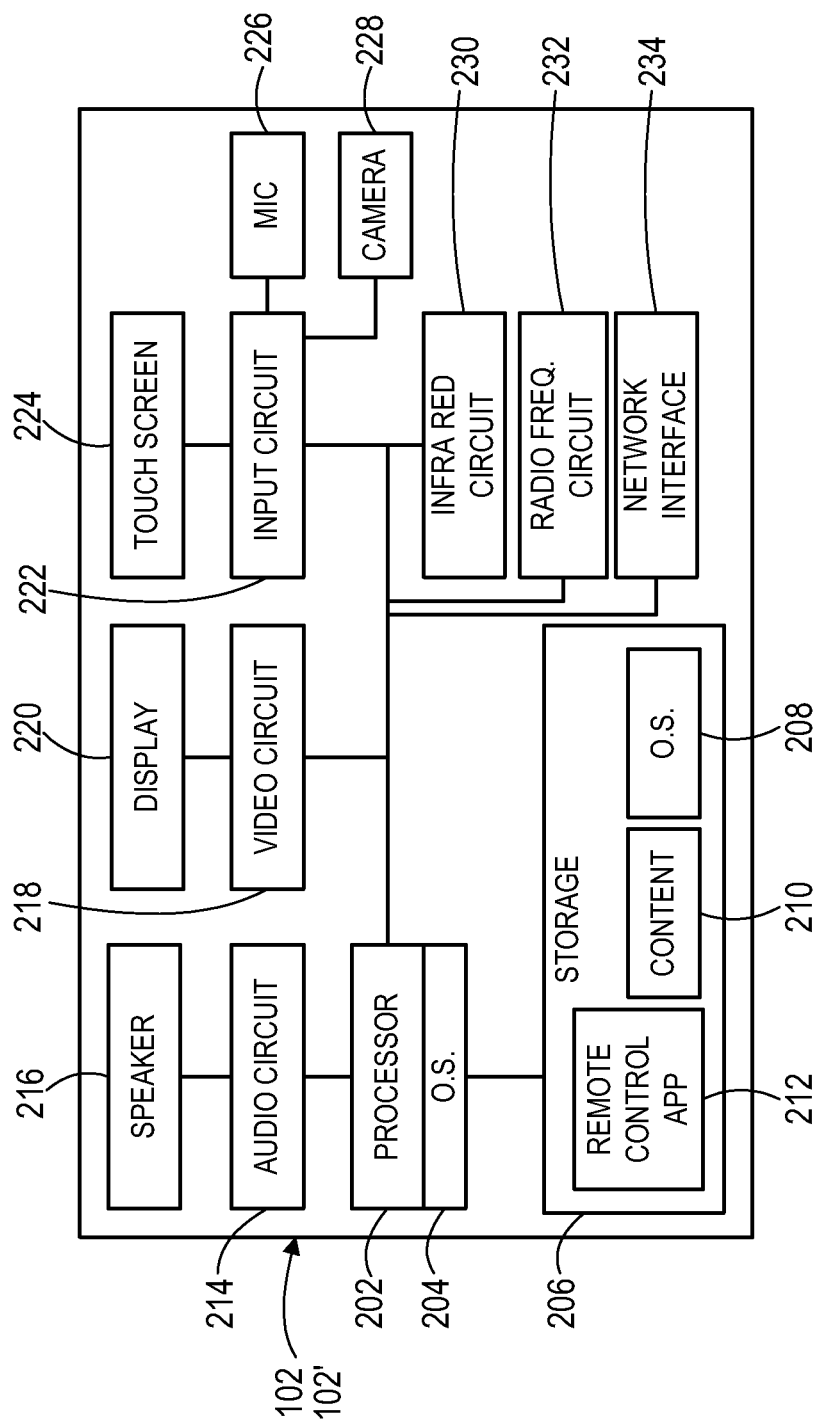
FIG. 2 shows an example of the components according to various embodiments of a remote control device to provide output of content at the remote control device while fast forwarding through content on a separate display device.

FIG. 2 shows an example of components that may be included in a remote control device 102, 102'. The remote control device 102, 102' may include a processor 202 such as a general purpose programmable processor, a dedicated purpose processor, hard wired digital logic, and the like. The processor 202 may implement an operating system 204 to allow the processor 202 to implement application programs and to interact with the various other components of the remote control device 102, 102'.

The processor 202 may access a storage device 206 such as a non-volatile memory where information may be stored. The information being stored may include various application programs, audio and/or visual content including advertising content, and the operating system 208. One of the application programs may be a remote control application 212 that allows the computing device 102, 102' to function as a remote control device. As an alternative, the computing device 102, 102' may be a dedicated remote control device with the capability of outputting video and/or audio.

The processor 202 also communicates with one or more forms of a content output that provides the content to the viewer 118 from the remote control device 102, 102' while fast forwarding or rewinding content on the separate display 104. For example, the processor 202 may communicate with an audio circuit 214 that drives a speaker 216 to produce audio that the viewer 118 can hear. As another example, the processor 202 may communicate with a video circuit 218 that drives the display screen 220 of the remote control device 102, 102' to display video or static images to the viewer 118 as well as to display the remote control functions 122.

The processor 202 also communicates with one or more forms of input that allows some external action to control the operations of the processor 202. For example, an input circuit 222 may be present and may allow the processor 202 to receive inputs from a first input such as a touchscreen 224, the inputs including the selections of the remote control functions by the viewer 118. According to some embodiments, the input circuit 222 may also allow the processor 202 to receive additional external signals via a second or subsequent input, such as audio information via a microphone 226 and/or visual information via a camera 228. According to some embodiments, the processor 202 may communicate with a network interface 234, such as an IEEE 802.11 wireless interface, as a second input to receive external signals in the form of data messages from the local data network that may control the operations of the processor 202.

The remote control device 102, 102' also includes one or more forms of a remote control output to allow the remote control device 102, 102' to send the control function that has been selected by the viewer 118 to the device that provides the content to the separate display device 104. For example, the processor 202 may communicate with an infrared circuit 230 to emit infrared signals that carry the control function selected by the viewer 118. As another example, the processor 202 may communicate with a radio frequency circuit 232 to emit radio frequency signals such as Bluetooth® signals or other such signals that carry the control function selected by the viewer 118. As yet another example, the processor 202 may communicate with the network interface 234 for purposes of delivering the control function as a data message over the local data network.

Figure 3:
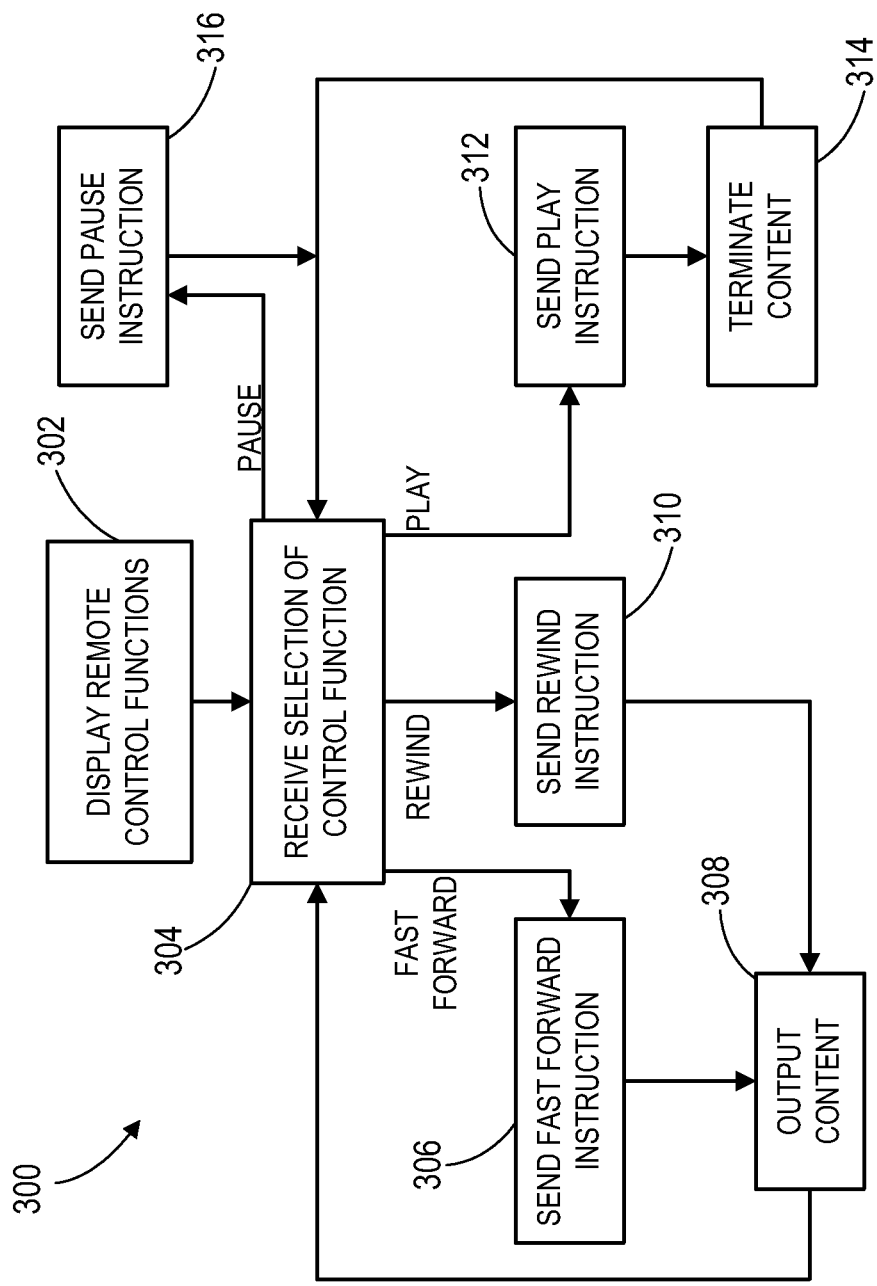
FIG. 3 shows an example of the logical operations that may be performed according to various embodiments of a remote control device to provide output of content at the remote control device while fast forwarding through content on a separate display device.

FIG. 3 shows an example of logical operations 300 that may be performed by the processor 202 of various embodiments of the remote control device 102, 102'. Initially, the processor 202 causes the remote control device 102, 102' to display the remote control functions at a display operation 302. These functions may be persistently displayed on the screen or may be selectively displayed or hidden as an option for the viewer 118. The processor 202 then receives a selection of a particular control function by the viewer 118 interacting with the touchscreen at a selection operation 304.

In this particular example, the functions include fast forward, rewind, play, and pause.

When the received selection is the fast forward function, then the processor 202 causes the fast forward instruction to be sent to the appropriate separate device through a remote control output at an instruction operation 306. As discussed above, the remote control output may be of various forms, such as in infrared signal, radio frequency signal, wireless networking signal, and the like.

The fast forward function that has been selected may be the standard fast forward function or may be an alternative fast forward function such as a successively selected 30 second skip function or a 30 second slip function. Because in any of these cases the viewer 118 may not adequately perceive the advertising content on the separate display device 104 as it is fast forwarding, the content being output by the remote control device 102, 102' at a normal speed may be better perceived.

At this point, the processor 202 also initiates the outputting of content from the remote control device 102, 102' at a content operation 308. As discussed above, the outputting of content from the remote control device 102, 102' may be audio, video, and/or static images. The processor 202 then awaits another control function at the selection operation 304.

When the received selection is the rewind function, then the processor 202 causes the rewind instruction to be sent to the appropriate separate device through a remote control output at an instruction operation 310. Again, the remote control output may be of various forms, such as in infrared signal, radio frequency signal, wireless networking signal, and the like.

At this point, the processor 202 of this example also initiates the outputting of content from the remote control device 102, 102' at the content operation 308. Again, the outputting of content from the remote control device 102, 102' may be audio, video, and/or static images. The processor 202 then awaits another control function at the selection operation 304.

When the received selection is the play function, then the processor 202 causes the play instruction to be sent to the appropriate separate device through a remote control output at an instruction operation 312. Again, the remote control output may be of various forms, such as in infrared signal, radio frequency signal, wireless networking signal, and the like.

At this point, the processor 202 of this example also terminates the outputting of content from the remote control device 102, 102' at a content operation 314. By terminating the outputting of the content, the viewer 118 can again focus on the content at the separate display device 104 without distraction from the remote control device 102, 102'. The processor 202 then awaits another control function at the selection operation 304.

When the received selection is the pause function, then the processor 202 causes the pause instruction to be sent to the appropriate separate device through a remote control output at an instruction operation 316. Again, the remote control output may be of various forms, such as in infrared signal, radio frequency signal, wireless networking signal, and the like. According to some embodiments including the example shown, the processor 202 then awaits another selection at the selection operation 304. As an alternative, the remote control device 102, 102' may begin outputting content at the content operation 308 in response to the pause function being selected.

In any of the cases above, some embodiments of the remote control device 102, 102' may also offer a skip function to the viewer 118. This skip function may allow the viewer 118 to select to terminate the outputting of content while maintaining the fast forward, rewind, or pause mode. This skip function may be provided immediately upon beginning the outputting of content from the remote control device 102, 102' or may be provided after some period of time to ensure that at least some of the content being output has been perceived.

In some cases, in order for the viewer 118 to stop the fast forwarding by selecting the play function at the appropriate time, the viewer 118 needs to be viewing the separate display 104 to see that the content of interest, such as the post-commercial break content, has been reached. However, where the remote control device 102, 102' is outputting visual content through the display of the remote control device 102, 102', the viewer 118 may not be paying adequate attention to the separate display 104. By providing an audio output rather than a visual output of content at the remote control device 102, 102', this issue may be avoided. However, various embodiments of the remote control device 102, 102' discussed below in relation to FIGS. 4 and 5 may also avoid this issue.

Figure 4:
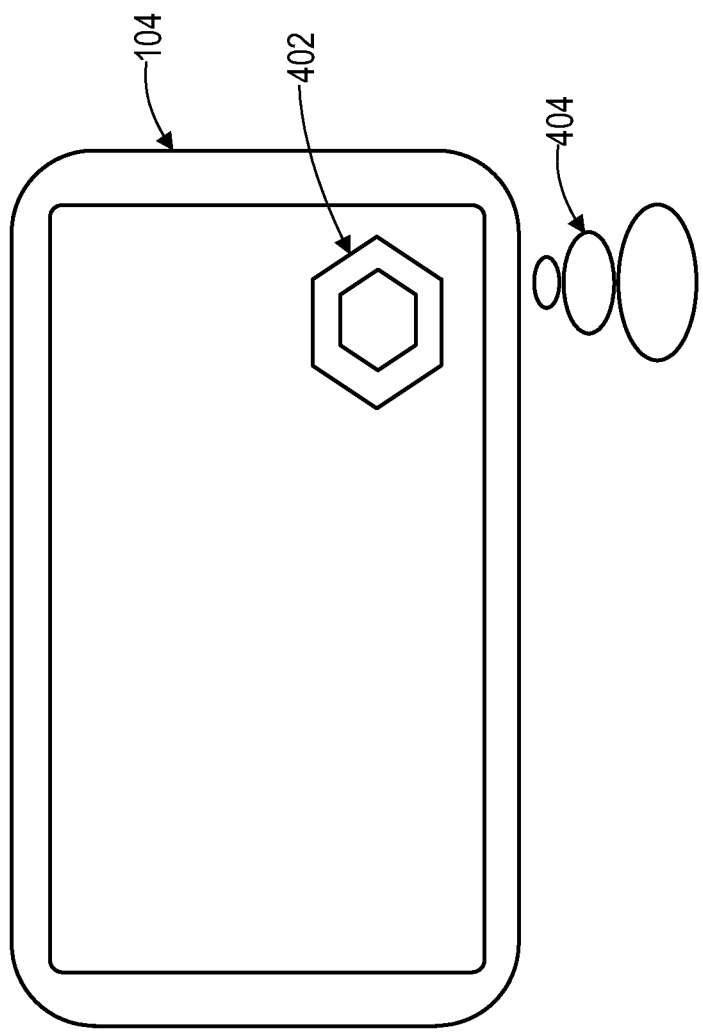
FIG. 4 shows an example where a separate display device outputs an external signal to a remote control device to terminate the output of content at the remote control device according to various embodiments.

The separate display device 104 is shown in FIG. 4. One manner of avoiding the issue of distracting the viewer 118 from selecting the play function at the proper time is to utilize the separate display device 104 as a source of an external signal to control the remote control device 102, 102'. Such control may be to send the play instruction from the remote control device 102, 102' at the proper time. To do so, the content being provided for display at the display device 104 may have a graphical element 402 or audible element 404 present in the audio/video stream of content being fast forwarded. For example, this graphical element 402, or this audible element 404 in the case of a content device that may produce audio while fast forwarding, is positioned in the stream of content such as during or adjacent the black space that signifies then end of a commercial break.

This graphical element 402 or audible element 404 is able to be recognized by the remote control device 102, 102' as an external signal that represents the play function. The camera 228 may capture the graphical element 402 and/or the microphone 226 may capture the audible element 404 which instructs the processor 202 to send the play instruction and terminate the outputting of content at the remote control device 102, 102'. Thus, if the viewer 118 does not select the play function, the remote control device 102, 102' will perceive the graphical element 402 or audible element 404 and send the play function on behalf of the viewer 118.

As another example of an external signal causing the remote control device 102, 102' to terminate the outputting of content, the device that is providing the content to the separate display device 104 may be in communication with the remote control device 102, 102' through a wireless form of communication. For example, the remote control device 102, 102' may be capable of receiving external signals through the infrared circuit 230, through the radio frequency circuit 232, and/or through the wireless networking interface 234. In such a case, the device that is providing the content may have the ability to detect the end of the commercial break, such as by detecting the black space or by detecting information within the audio/video signal. In that case, the device providing the content to the display device 104 may be capable of returning to the normal play mode without receiving an instruction from the remote control device 102, 102', but the remote control device 102, 102' continues to output content. Thus, upon detecting the end of the commercial break, the device that is providing the content to the display device 104 may then send the external signal to the remote control device 102, 102' to cause the remote control device 102, 102' to terminate the outputting of content as if the play function of the remote control device 102, 102' had been selected by the viewer 118.

Figure 5:
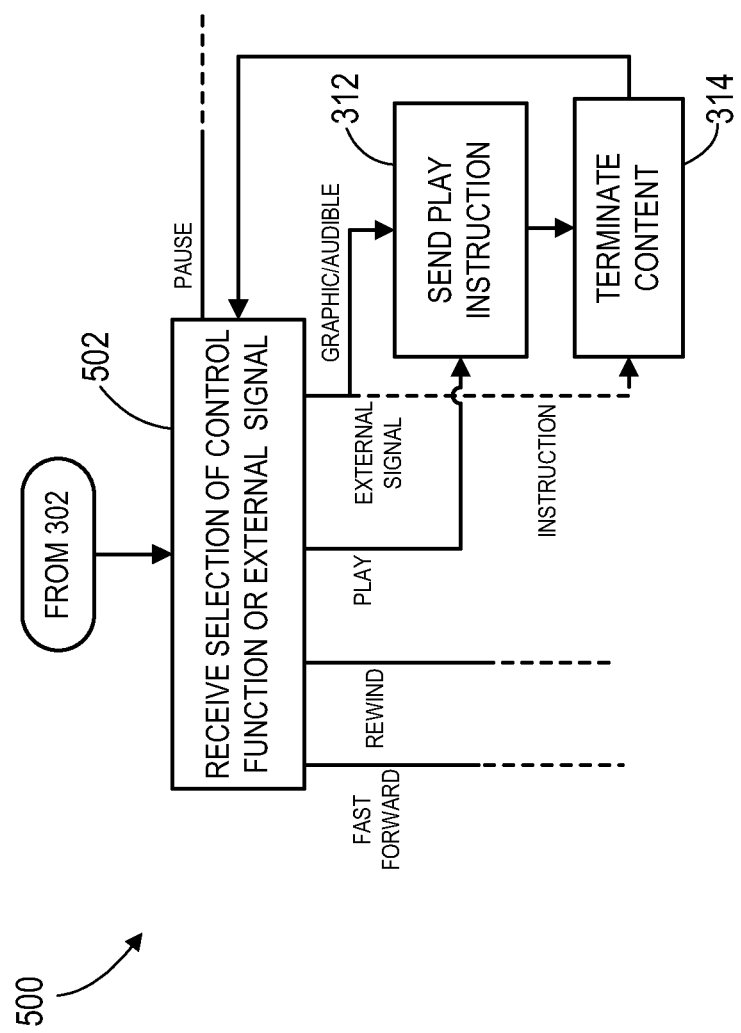
FIG. 5 shows an example of logical operations of a remote control device to respond to an external signal to terminate the output of content at the remote control device.

FIG. 5 shows an example of an alteration 500 to the logical operations 300 of FIG. 3 that allows the processor 202 to be responsive to such external signals, including a graphical or audible element or an instruction. After the display operation 302, the processor 202 then receives either a selection by the viewer 118 via the touchscreen of one of the control functions or receives one of the forms of the external signal discussed above. Where the selection is the fast forward, rewind, play, or pause function, the processor 202 proceeds as described for FIG. 3.

However, where the processor 202 receives a form of external signal, the operations then proceed as shown in FIG. 5. Where the external signal is a graphical or audible element from the display device 104, the processor 202 then causes the play instruction to be sent at the instruction operation 312 and terminates the content being output by the remote control device 102, 102' at the content operation 314. Where the external signal is the data instruction from the device that is providing the content to the separate display device 104, then the processor 202 may terminate the outputting of content from the remote control device 102, 102' at the content operation 314 without sending the play instruction. The device that is providing the content to the separate display device 104 has presumably already returned to the play mode considering this same device has provided the instruction to the remote control device 102, 102'.

Figure 6:
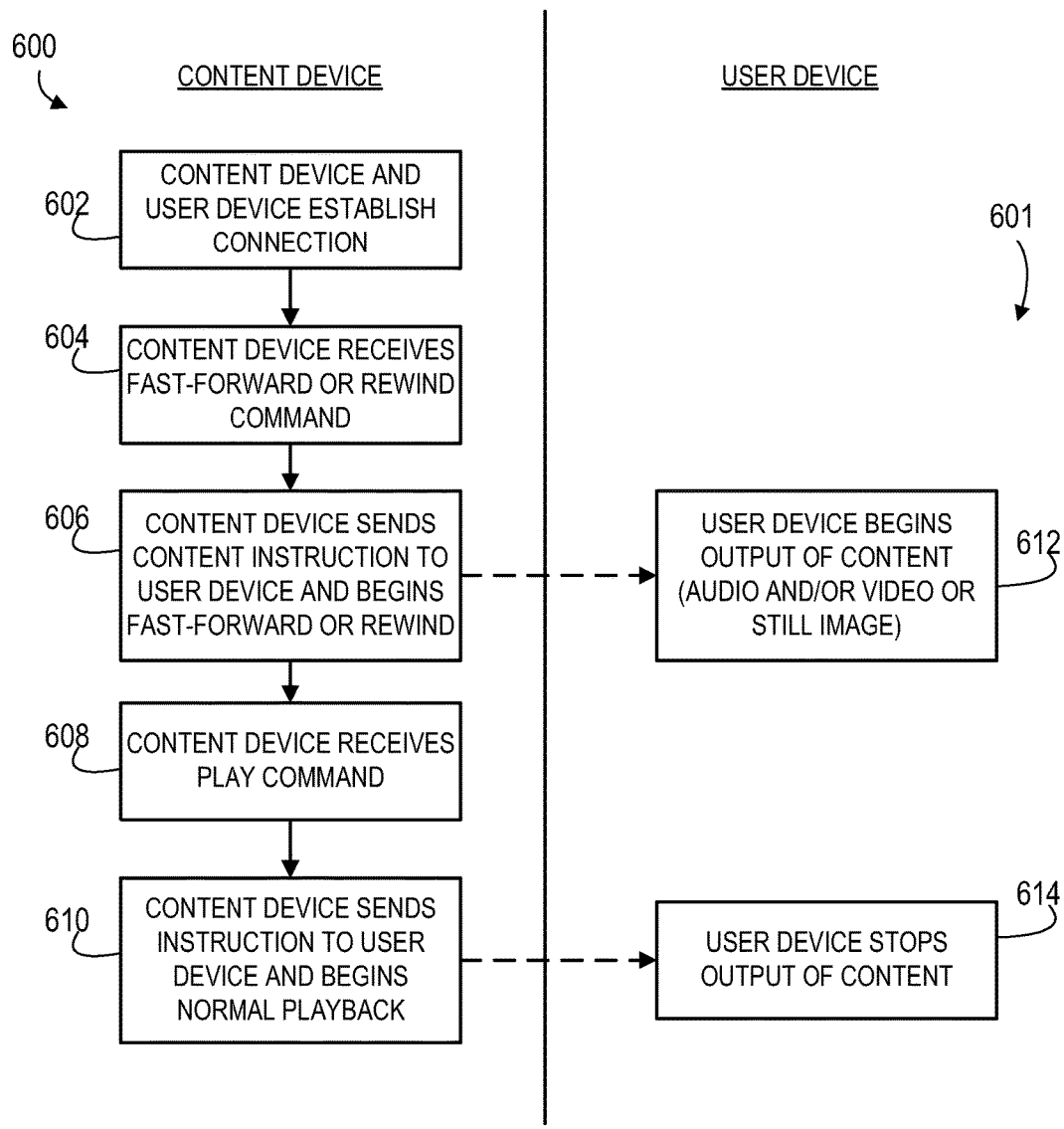
FIG. 6 shows an example of logical operations that provide interaction between a content device and a user device according to other embodiments.

FIG. 6 shows an example of logical operations of other embodiments where a content device interacts with a user device such that the user device provides content during fast forwarding or rewinding at the content device at the request of the content device. The content device may be of various forms, such as the DVR 112 or the television 104 of FIG. 1, an Internet appliance and the like, that provides content for display at the television 104. The user device may be of various forms such as the smartphone 102', the tablet 102, a personal computer or any other type of device capable of providing audio and/or video or image content to the user separately from the display of content at the television 104.

The logical operations 600 of the content device result in interaction with the user device to bring about the logical operations 601 of the user device. Initially, the content device and the user device may establish a connection, such as through a Wi-Fi connection, infrared, radio frequency, and the like at a connection operation 602. As an alternative to this initial connection, the content device and the user device may interact at a later time as discussed below by the content device providing an audible or visual signal such as those discussed above with reference to FIG. 4, albeit in a different context.

The content device receives a fast-forward or a rewind command from a user at a command operation 604. This command may originate from the user device or may originate from an entirely different device such as a conventional remote control that lacks the ability to output content. In response to this command, the content device sends a content instruction to the user device and the content device then begins fast-forwarding or rewinding content on the television 104 as commanded at the content operation 606. The content instruction may be provided through the pre-established wireless connection to the user device. Alternatively, where there is no pre-established wireless connection between the content device and the user device, the content device may provide the instruction via audible or visual information like that of FIG. 4 to instruct the user device.

Meanwhile, the user device receives the content instruction from the content device and responds to the instruction by beginning to output content at an output operation 612. The content being output by the user device may be audio, video, still images, or combinations. Thus, there is content being output by the user device while the content device is fast-forwarding or rewinding through content being provided to the television 104, regardless of whether the fast-forward or rewind command originated from the user device or from a conventional remote control.

Eventually the content device will receive a play command initiated by the viewer that originates from either the user device or from another device such as a conventional remote control at a command operation 608. In response to this command, the content device sends a content instruction to the user device and the content device then begins normal playback of content on the television 104 as commanded at the content operation 606. The content instruction may be provided through the pre-established wireless connection to the user device. Alternatively, where there is no pre-established wireless connection between the content device and the user device, the content device may provide the instruction via audible or visual information like that of FIG. 4 to instruct the user device. The user device responds to the instruction by terminating the output of content at an output operation 614.

While embodiments have been particularly shown and described, it will be understood by those skilled in the art that various other changes in the form and details may be made therein without departing from the spirit and scope of the invention.

What is claimed is:

1. A remote control device for providing advertisements to a viewer of a display device, comprising:
   a housing;
   an input coupled to the housing that receives a fast forward selection from the viewer to initiate a fast forwarding of content being displayed on a display device;
   a remote control instruction output coupled to the housing that produces a fast forward instruction upon the input receiving the fast forward selection; and
   a content output coupled to the housing that, upon the input receiving the fast forward selection, begins outputting the advertising content;
   wherein the input receives a play selection from the viewer to terminate a fast forwarding of content being displayed on the display device, wherein the remote control output produces a play instruction upon the input receiving the play selection, and wherein the content output terminates presentation of advertising content upon the input receiving the play selection.

2. The remote control device of claim 1, wherein the content output is a display screen and the advertising content comprises video.

3. The remote control device of claim 1, wherein the content output is a speaker and the advertising content comprises audio.

4. The remote control device of claim 1, further comprising a processor and a storage medium containing an operating system and an application program, wherein the processor implements the operating system to execute the application program to receive the fast forward selection via the input, to produce the fast forward instruction via the remote control instruction output, and to begin outputting advertising content via the content output.

5. The remote control device of claim 4, wherein the housing has a tablet form factor.

6. The remote control device of claim 4, wherein the housing has a smartphone form factor.

7. The remote control device of claim 1, wherein the input comprises a touchscreen.

8. The remote control device of claim 1, wherein the remote control output comprises an infrared emitter.

9. The remote control device of claim 1, wherein the remote control output comprises a network interface.

10. The remote control device of claim 1, further comprising a second input, wherein the second input receives an external signal to terminate a fast forwarding of content being displayed on the display device, and wherein the content output terminates presentation of advertising content when the second input receives the external signal.

11. The remote control device of claim 10, wherein the remote control output produces a play instruction when the second input receives the external signal.

12. The remote control device of claim 10, wherein the second input comprises a camera and wherein the external signal comprises a graphical element being output by the display device that is captured by the camera.

13. The remote control device of claim 10, wherein the second input comprises a network interface and wherein the external signal comprises a data message transferred over a network to the network interface.

14. A remote control device for providing advertisements to a viewer of a display device, comprising:
  a housing;
  an input coupled to the housing that receives a fast forward selection from the viewer to initiate a fast forwarding of content being displayed on a display device;
  a remote control instruction output coupled to the housing that produces a fast forward instruction upon the input receiving the fast forward selection;
  a content output coupled to the housing that, upon the input receiving the fast forward selection, begins outputting the advertising content; and
  a second input coupled to the housing, wherein when the second input receives an external signal to terminate the fast forwarding of content being displayed on the display device, the content output terminates presentation of advertising content.

15. The remote control device of claim 14, wherein when the input receives a play selection from the viewer to terminate a fast forwarding of content being displayed on the display device, the remote control output produces a play instruction and the content output terminates presentation of advertising content.

16. The remote control device of claim 14, wherein the remote control output produces a play instruction when the second input receives the external signal.

17. The remote control device of claim 14, wherein the second input comprises a camera and wherein the external signal comprises a graphical element being output by the display device that is captured by the camera.

18. The remote control device of claim 14, wherein the second input comprises a network interface and wherein the external signal comprises a data message transferred over a network to the network interface.

19. The remote control device of claim 14, further comprising a processor that implements a plurality of application programs, at least one of the plurality of application programs being an application program that provides remote control functions and wherein the input receives the fast forward selection from the viewer by the viewer interacting with the application that provides remote control functions.

20. A remote control device for providing advertisements to a viewer of a display device, comprising:
  a housing;
  a processor coupled to the housing that implements a plurality of application programs, at least one of the plurality of application programs being an application program that provides remote control functions;
  an input coupled to the housing that receives a fast forward selection from the viewer by the viewer interacting with the application program that provides remote control functions to initiate a fast forwarding of content being displayed on the display device;
  a remote control instruction output coupled to the housing that produces a fast forward instruction upon the input receiving the fast forward selection; and
  a content output coupled to the housing that, upon the input receiving the fast forward selection, begins outputting the advertising content;
  wherein the input receives a play selection from the viewer by the viewer interacting with the application that provides remote control functions to terminate a fast forwarding of content being displayed on the display device, wherein the remote control output produces a play instruction upon the input receiving the play selection, and wherein the content output terminates presentation of advertising content upon the input receiving the play selection.

* * * * *